United States Patent
Sunderman et al.

[11] 3,725,988
[45] Apr. 10, 1973

[54] TOOL

[75] Inventors: Elwin Sunderman, Inglewood; Merle Hilliard, Los Angeles, both of Calif.

[73] Assignee: Sennet Tool and Manufacturing Company, Hawthorne, Calif.

[22] Filed: Dec. 7, 1970

[21] Appl. No.: 95,539

[52] U.S. Cl. ..............................29/105 R, 29/96 R
[51] Int. Cl. .....................B26d 1/00, B26d 1/12
[58] Field of Search.....................29/96, 97, 98, 105, 29/105 A; 279/22, 75

[56] References Cited

UNITED STATES PATENTS

| | | | |
|---|---|---|---|
| 3,106,011 | 10/1963 | Clifton et al. | 29/105 |
| 1,716,762 | 6/1929 | Buxbaum | 29/96 |
| 3,566,506 | 3/1971 | Wolf | 29/105 X |

FOREIGN PATENTS OR APPLICATIONS

| | | | |
|---|---|---|---|
| 318,815 | 2/1920 | Germany | 29/105 |
| 1,124,730 | 8/1968 | Great Britain | 29/105 |

*Primary Examiner*—Harrison L. Hinson
*Attorney*—Julius L. Rubinstein

[57] ABSTRACT

A cylindrical support for a cutting tool is provided with a plurality of grooves. A series of alternate sized cylindrical rollers are mounted in each groove and the cylindrical rollers are all in abutting relationship to each other. In addition, a helical cutting blade is mounted in each groove with one surface of the cutting blade bearing against a support wall of the groove and the other surface of the cutting blade facing and abutting the larger cylindrical rollers in each groove. The smaller cylindrical rollers in the grooves bear against the wall of the groove opposite to the wall that the cutting blade bears against. Each groove is provided with a threaded bore extending parallel to a longitudinal dimension of the groove. A set screw is threadedly mounted in each bore. The inner end of the set screw bears against the end cylindrical roller in each of the series of rollers. By screwing the set screw inwardly against the end roller the cylindrical rollers move relative to each other and transverse to the direction of the force exerted by the screw so that they move against the helical blade at spaced distances along the length of the blade forcing the helical blade against the supporting wall of the groove and locking the blade in the groove.

This invention relates generally to a tool and more particularly to a mounting structure for helical carbide blades on a cutting tool.

20 Claims, 5 Drawing Figures

PATENTED APR 10 1973 3,725,988

INVENTORS
MERLE HILLIARD
ELWIN SUNDERMAN

BY
Julius Louis Grubinstein
ATTORNEY

TOOL

BACKGROUND AND BRIEF SUMMARY

Helical end mills, shell end mills, and slab mills are frequently used with numerical controlled milling machines. These helical cutting tools generally comprise helical carbide blades which are fastened to a cylindrical shank or support. After a period of use these blades wear and they must be readjusted to bring them back to their original size.

Heretofore, the helical carbide blades were brazed to the support body or shank, but brazing was objectionable because the heat required to braze the blade to the support introduced stresses in the blade and these stresses often caused unpredictable blade failure. Furthermore, it was time consuming and difficult to heat the support bodies first to remove the blade for purposes of repair or replacement in order to bring the tool back to it's original size, and then to reheat the body again to again braze the replaced or repaired blade to the support.

To overcome the problems caused by brazing the blade to the support body, other procedures were developed. A typical procedure involved mounting the carbide blades in grooves formed in the support body and locking the blades in the grooves by means of screw mounted wedges which were screwed into the grooves by radially mounted screws extending through the screw holes in the wedges into the body of the shank or support.

This procedure required the surface of the wedge bearing against the face of the carbide blade to be machined to very close tolerances and this necessary machining operation was expensive and time consuming. Furthermore, this arrangement also requires the surface of the carbide blade facing the wedge to be ground very smooth which further increased the cost of the carbide blade. This is because any imperfection in the machining of these surfaces would cause the wedge to bear against the side of the blade at points which could be spaced far enough apart to cause the carbide blade to crack. Besides this, the opposite surface of the wedge also had to be ground smooth so it fit smoothly against the precision finished side of the groove.

All these machine operations were very expensive. To overcome the disadvantages inherent in the prior systems for locking the helical balde on a support, this invention includes grooves formed in the support body. A series of alternate sized cylindrical rollers are positioned in each groove in an abutting relationship to each other. Helical carbide cutting blades are inserted in these grooves in such a way that the largest of the cylindrical rollers in each series bears against one surface of the blade. The opposite surface of the blade in each groove bears against a support wall of the groove. With this arrangement, if a force is directed against the end roller in the series of rollers, the remaining rollers in the series will move relative to each other in a direction transverse to the direction of the force and in such a way that the larger rollers in each series moves against one surface of the helical cutting blade at spaced points along the length of the blade. This forces the blade against the support wall of the groove and locks the blade in the groove so long as force is directed against the end roller of the series of cylindrical rollers and is transmitted against the larger and/or smaller sets of rollers. Furthermore, the large number of points of engagement between the cylindrical rollers and the facing surface of the helical carbide blade results in relatively small gaps between the rollers and this prevents the blade from breaking. The free movement of the rollers permits pressure to be evenly spread along the length of the blade, thus accommodating small imperfections in the shape of the blade. Consequently, the facing surface of the carbide blade need not be ground to a high degree of precision.

Of course, blades mounted in cutting tools may have different shapes and it would be desirable to provide a blade locking mechanism which could lock any blade having any shape or curvature on a support and to provide such a mounting structure comprises an important object of this invention.

A further object of this invention is to provide a compact blade mounting structure applied to a support thus permitting a greater number of blades to be removably mounted on a given periphery of a support.

These and other objects of this invention will become more apparent when understood in the light of the accompanying specification and drawings, wherein.

Figure 1:
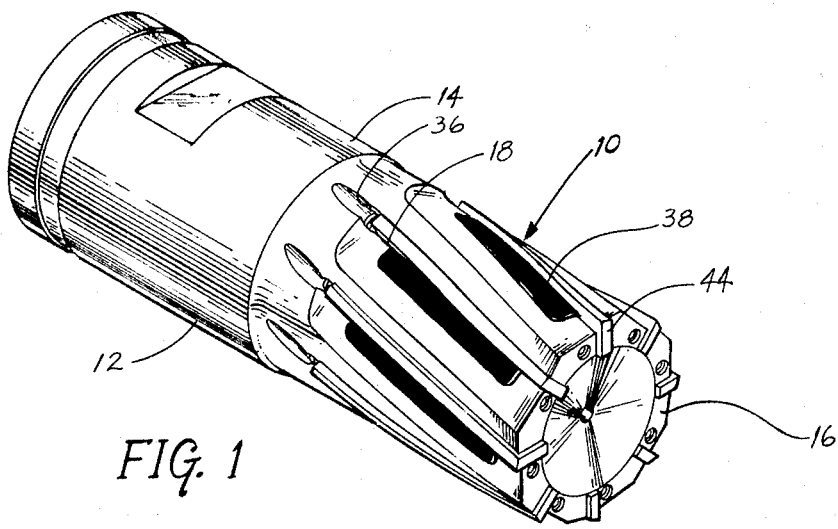
FIG. 1 is a perspective view of a cutting tool constructed according to the principles of this invention.

Referring now to FIG. 1 of the drawing, a cutting tool indicated generally by the reference number 10 includes a generally cylindrical mounting structure or support 12. In this particular embodiment the support includes a rear cylindrical stem 14 for insertion in a tool holder, and a forward portion 16 on which the blades are mounted. It is, however, to be understood that the shape of the support is not crucial to the practice of this invention and it is contemplated that the support for the cutting tool of this invention could have other shapes. For example, the support could be a cylindrical tube in shape, as on a shell end mill, or have any other suitable configuration. The forward portion 16 includes a cutting end 20 and an inner end 22. In the particular embodiment shown the blades project beyond the cutting end 20, see FIG. 4, although this arrangement is not essential to the practice of this invention, and it is contemplated that the blades could be mounted so they do not project beyond the ends of the support.

Generally axially extending blade receiving grooves 18 are formed on the periphery of the forward portion 16. These grooves conform to the contour of the blades which are to be locked in them and in the case of a helical carbide blade, for example, the grooves would be helical. If the blades to be locked in the supports were straight then the grooves would have to be straight and so forth. In the particular embodiment shown eight blade receiving grooves are formed in the forward portion 16.

Figure 2:
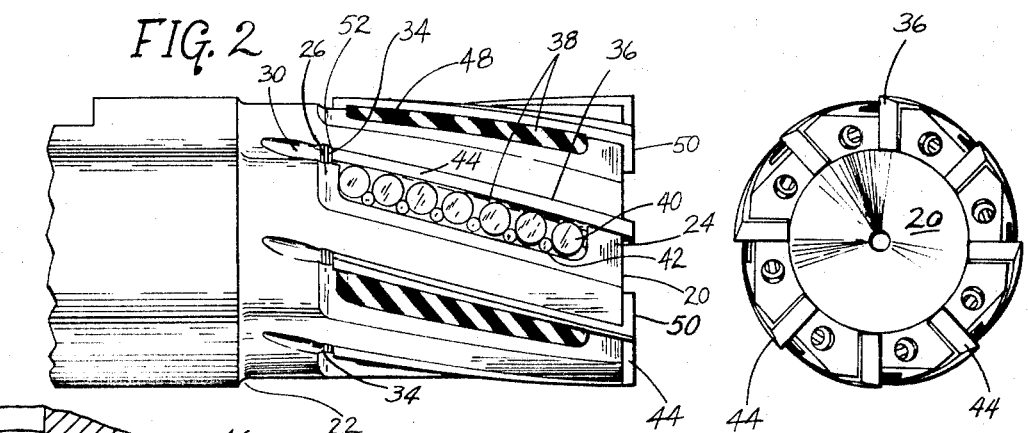
FIG. 2 is a side elevational view of the cutting tool shown in FIG. 1.
Figure 3:
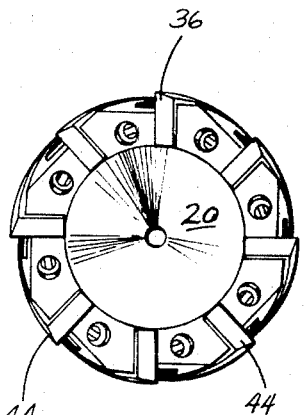
FIG. 3 is an end elevational view of the cutting tool.

As best seen in FIGS. 1 and 2, the blade receiving grooves are formed intermediate the opposed ends 20 and 22 of the forward portion 16 of the support 12. These grooves are provided with partial end walls 24 and 26 extending generally transverse to the length of the groove. An axially extending threaded screw receiving bore 28 is formed in end wall 24 and pressure screw 32 is mounted in this bore. A threaded groove 30 is formed in end wall 26 and a screw 34 is mounted therein, see FIGS. 1, 2 and 4. End wall 24 extends part way across the width of the blade receiving groove 18 defining thereby a blade receiving gap 25 at the end of the groove through which the cutting blade end 50 of the blade 44 extends as it projects beyond the cutting end 20 of the support portion 14. This permits the blade 44 to be shifted axially in the groove by means of screw 34.

In this particular embodiment, the grooves are provided with a blade support wall 36 and this support wall conforms to the contour of the cutting blade to be mounted on the support. In this instance, helical carbide blades are to be mounted on the support so the support wall would be helical, see FIG. 1.

A force or motion transmitting unit 38 is mounted in each groove. These units comprise a first and second group of cylindrical rollers with the rollers 40 in the first group twice the diameter of the rollers 42 in the second group. The rollers in each motion transmitting unit are arranged in a series of alternate sizes in abutting relationship to each other, as shown best in FIG. 4, and they are embedded in a slab of rubber-like material 48. The slab is generally rectangular in cross-section and the rollers are arranged so the rollers of the larger group are generally tangent to one surface of the slab while the rollers in the smaller group are generally tangent to the opposite surface of the slab, see FIG. 5. For the sake of clarity, the rubber slab 44 has been removed in FIGS. 2 and 4 to illustrate the position of the rollers and the transmission of forces. The rubber slab in FIG. 5 is partially broken away to show the position of the rollers in the slab.

Figure 4:
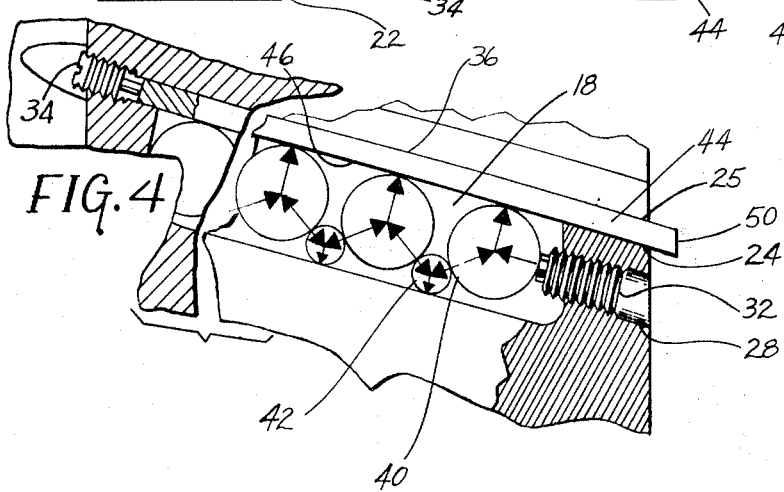
FIG. 4 is an enlarged elevational view of a portion of the cylindrical support showing details of the locking mechanism.
Figure 5:
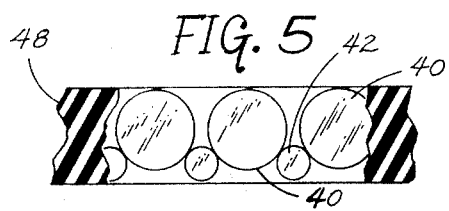
FIG. 5 is an elevational view of a portion of the blade locking mechanism used with the cutting tool.

In the present embodiment, helical carbide blades 44 are mounted in each groove with one surface abutting blade support wall 36 and the other surface abutting the force transmitting unit in engagement with the larger rollers 40, see FIG. 4.

When a helical carbide blade 44 is inserted in a blade receiving groove 18 along with the force or motion transmitting unit 38, as shown in FIG. 4, then rotation of screw 32 inwardly and axially, see FIG. 4 causes the end of the screw 32 to engage the end roller in the series of rollers and this exerts lateral pressure on the force transmitting unit. This pressure causes the rollers 40 and 42 to move relative to each other in a direction transverse to the direction of the force applied by screw 32 and in such a way that the rollers 40 move into engagement with the facing surface of the helical carbide blade opposite the surface engaging the blade support wall 36 while rollers 42 move in a generally opposite direction contacting the inner wall of groove 18. In so doing, the regions of engagement between the cylindrical rollers 40 and the surface of the helical carbide blade define a helical surface coincident with the surface 46 of the helical carbide blade. As shown in FIGS. 2 and 4, the rollers 40 move into pressing and locking engagement with the blade 44 at uniformly spaced intervals along the length of the blade. This arrangement prevents blade fracture which occurred in prior blade locking structures when the wedge was pressed against an irregular portion of the surface of the blade. With this arrangement, the helical contour of the blade facing the rollers 40 does not need to be ground so precisely because any irregularities in the contour are compensated for, by greater or lesser movements of the roller opposite the point of irregularity.

As stated above, continuous use wears away the blade cutting edges. When this occurs the blades may be easily removed by loosening screw 32 and removing the blade 44 so that a shim can be inserted beneath the blade in groove 18. This causes the blade to be positioned outwardly from the axis of the support so the blade can be locked on the support and reground to return to its proper size.

Cutting end 50 of blade 44 also becomes worn. When this happens the blade 40 may be readjusted by loosening screws 32 to loosen the blade 44. Then the screws 34 may be screwed axially inwardly against the end 52 of blade 44 to force the blade 44 longitudinally through gap 25 a distance sufficient to permit the cutting end 50 to be reground to return to its proper size and shape.

Having described the invention, what I claim as new is:

1. A cutting tool of the class described comprising a support, a plurality of generally axially extending blade receiving grooves formed on the periphery of the support, each support having one support wall shaped to conform to the curvature of the blade to be mounted on the support, a motion transmitting unit mounted in said groove, said motion transmitting unit including a plurality of spaced abutting members, said abutting members movable relative to each other at least in the direction of the width of the groove, a blade mounted in each groove, each blade mounted so one surface bears against the support wall of the groove and the opposite surface abuts said abutting members, and means for actuating said force transmitting unit so said abutting members are movable into locking engagement with said opposite surface of the blade at spaced intervals along the length of the blade, the size of said abutting members and their numbers selected so the gaps between the point of engagement between the abutting members and said opposite surface of the blade are small enough to prevent the blade from cracking when the blade is locked in the blade receiving groove.

2. A cutting tool of the class described comprising a support, said support having a cutting end, a plurality of generally axially extending blade receiving grooves formed on the periphery of the support, each groove having one support wall shaped to conform to the curvature of the blade to be mounted on the support and formed with end walls extending generally transverse to the length of the groove, at least one end wall extending part way across the width of the groove and defining thereby a blade receiving gap at the cutting end of the support, a force transmitting unit in said groove, said force transmitting unit including a plurality of spaced abutting members, said abutting members movable relative to each other at least in the direction of the width of the groove, a blade mounted in each groove and extending through said gap, each blade mounted so one surface bears against the support wall of the groove and the opposite surface abuts said abutting members, and means for actuating said force transmitting unit so said abutting members are movable into locking engagement with said opposite surface of the blade at spaced intervals along the length of the blade, the size of said abutting members and their numbers selected so the space between the points of engagement between the abutting members and said opposite surface of the blade are small enough to prevent the blade from cracking when the blade is locked in the blade receiving groove.

3. The cutting tool described in claim 1 wherein said means for actuating said force transmitting unit can be operated to permit movement of said abutting members out of pressing engagement with said blade to permit the blade to be removed from said support.

4. The cutting tool described in claim 2 wherein said means for actuating said force transmitting unit can be operated to permit movement of said abutting members out of pressing engagement with said blade to permit the blade to be removed from said support.

5. The cutting tool described in claim 2 including means mounted on said support for moving each blade in a generally axially direction along said groove for purposes of adjustment.

6. The cutting tool described in claim 2 wherein said end wall extending part way across each groove is provided with an axially extending threaded bore, a pressure screw in said bore, said pressure screw movable against the force transmitting unit in said groove to exert pressure thereon to actuate said abutting members.

7. A cutting tool of the class described comprising a support, a plurality of generally axially extending blade receiving grooves formed on the periphery of the support, each groove having one support wall shaped to conform to the curvature of the blades to be mounted in the groove on the support, a force transmitting unit mounted in each groove, each force transmitting unit comprising a series of abutting rollers mounted in the groove and disposed along the length of the groove, the alternate rollers in each groove arranged so pressure exerted against the end of the series of rollers causes the rollers to move relative to each other and in such a way that the rollers move transverse to the direction of the force applying the pressure and transverse to the length of the groove, a blade mounted in each groove, each blade mounted so one surface bears against the support wall of the groove and the opposite surface abuts said alternate rollers, and means on said support for exerting pressure against the end of each of the series of rollers to cause the alternate rollers to move into locking engagement with the opposite surface of the blade at spaced intervals along the length of the blade, the size of said abutting rollers and their numbers selected so the space between the points of engagement between the abutting members and said opposite surface of the blade are small enough to prevent the blade from cracking when the blade is locked in a blade receiving groove.

8. A cutting tool of the class described comprising a support, a plurality of generally axially extending blade receiving grooves formed on the periphery of the support, each groove having one support wall shaped to conform to the curvature of the blades to be mounted in the groove on the support, a force transmitting unit mounted in each groove, each force transmitting unit comprising a series of abutting rollers mounted in the groove and disposed along the length of the groove, the alternate rollers in each groove arranged so pressure exerted against the end of the series of rollers causes the rollers to move relative to each other and in such a way that the rollers move transverse to the direction of the force applying the pressure and transverse to the length of the groove, a blade mounted in each groove, each blade mounted so one surface bears against the support wall of the groove and the opposite surface abuts said alternate rollers, and means on said support for exerting pressure against the end of each of the series of rollers to cause the alternate rollers to move into locking engagement with the opposite surface of the blade at spaced intervals along the length of the blade, and each series of rollers comprising alternate size rollers, said rollers arranged so the larger rollers constitute abutting members and are movable into locking engagement with said opposite surface of the blade.

9. The cutting tool described in claim 8 wherein the alternate size series of rollers comprising a first group of rollers and a second group of rollers, the rollers in the first group twice the diameter of the rollers in the second group, said rollers arranged so they are in a series of alternate size.

10. A cutting tool of the class described comprising a support, said support having a cutting end, a plurality of generally axially extending blade receiving grooves formed on the periphery of the support, each groove having one support wall shaped to conform to the curvature of the blade to be mounted in the groove and formed with end walls extending generally transverse to the length of the groove, at least one end wall extending part way across the width of the groove and defining thereby a blade receiving gap at the end of the groove so an end of the blade can project beyond the cutting end of the support, a force transmitting unit in each groove, each force transmitting unit comprising a series of abutting rollers mounted in the groove and disposed along the length of the groove, the alternate rollers in each groove arranged so pressure exerted against the end of the series of rollers causes the rollers to move relative to each other in such a way that the rollers move transverse to the direction of the force applying the pressure and move transverse to the length of the groove, a blade mounted in each groove and extending through said gap beyond the cutting end of the support, each blade mounted so one surface bears against the support wall of the groove and the opposite surface abuts said alternate rollers, and means on said support for exerting pressure against the end of each of the series of rollers to cause the alternate rollers to move into locking engagement with the said opposite surface of the blade at spaced intervals along the length of the blade, the size of said rollers and their numbers selected so the spacing between the points of engagement between the rollers and said opposite surface of the blade is small enough to prevent the blade from cracking when the blade is locked in the blade receiving groove.

11. The cutting tool described in claim 10 wherein said end wall extending part way across the width of the groove is provided with an axially extending threaded bore, a pressure screw in said bore, said pressure screw movable against the end roller of the series of rollers in the adjacent groove to cause the alternate rollers to move into locking engagement with the said opposite surface of the blade at spaced intervals along the length of the blade.

12. A cutting tool of the class described comprising a support, said support having a cutting end, a plurality of generally axially extending blade receiving grooves formed on the periphery of the support, each groove having one support wall shaped to conform to the curvature of the blade to be mounted in the groove and formed with end walls extending generally transverse to the length of the groove, at least one end wall extending part way across the width of the groove and defining thereby a blade receiving gap at the end of the groove so an end of the blade can project beyond the cutting end of the support, a force transmitting unit in each groove, each force transmitting unit comprising a series of abutting rollers mounted in the groove and disposed along the length of the groove, the alternate rollers in each groove arranged so pressure exerted against the end of the series of rollers causes the rollers to move relative to each other in such a way that the rollers move transverse to the direction of the force applying the pressure and move transverse to the length of the groove, a blade mounted in each groove and extending through said gap beyond the cutting end of the support, each blade mounted so one surface bears against the support wall of the groove and the opposite surface abuts said alternate rollers, and means on said support for exerting pressure against the end of each of the series of rollers to cause the alternate rollers to move into locking engagement with the said opposite surface of the blade at spaced intervals along the length of the blade, said end wall extending part way across the width of the groove provided with an axially extending threaded bore, a pressure screw in said bore, said pressure screw movable against the end roller of the series of rollers in the adjacent groove to cause the alternate rollers to move into locking engagement with the said opposite surface of the blade at spaced intervals along the length of the blade, and each series of rollers comprise rollers arranged in alternate size, said rollers arranged so the larger rollers constitute abutting members and are movable into locking engagement with said opposite surface of the blade.

13. The cutting tool described in claim 12 wherein the alternate size series of rollers comprise a first group of rollers and a second group of rollers, the rollers in the first group twice the diameter of the rollers in the second group, said rollers arranged so they are in an alternate size series.

14. The rollers described in claim 13 wherein said rollers are all cylindrical.

15. The cutting tool described in claim 10 including means mounted on said support for moving each blade in a generally axial direction along said groove through said blade receiving gap for purposes of adjustment.

16. The cutting tool described in claim 15 wherein said means for moving said blade in an axial direction comprises a screw receiving threaded groove formed in the end wall of each groove opposite said one end wall, a screw threaded in each groove, each screw movable into engagement with an end of each blade so that by rotating said screw said blades can be moved axially in said grooves through said blade receiving gap in the direction of the cutting end of said support.

17. A cutting tool of the class described comprising a support, a plurality of grooves formed in said support, a blade and a force transmitting unit mounted in each groove, each force transmitting unit comprising a series of rollers embedded in a rubber-like material, said rollers arranged so pressure against the side of each unit causes some of the rollers to move relative to each other in a direction transverse to the direction of the force applying the pressure and against a surface of the blade to releasably lock the blade in the groove, and means on the support for exerting pressure against the side of each force transmitting unit.

18. The cutting tool described in claim 17 wherein the rollers in said series of rollers are alternate size and are embedded in a slab of rubber-like material generally rectangular in cross-section, said rollers arranged so the larger rollers are generally tangent to one surface of the slab and the smaller rollers are generally tangent to the opposite surface of the slab, the larger rollers disposed against a surface of the blade and movable into engagement therewith to releasably lock the blade into the groove.

19. The cutting tool described in claim 18 wherein the larger rollers are twice the diameter of the smaller rollers.

20. The cutting tool described in claim 19 wherein the rollers are cylindrical.

* * * * *